United States Patent

Guedalia

[11] Patent Number: 5,968,120
[45] Date of Patent: Oct. 19, 1999

[54] METHOD AND SYSTEM FOR PROVIDING ON-LINE INTERACTIVITY OVER A SERVER-CLIENT NETWORK

[75] Inventor: Jacob Leon Guedalia, Jerusalem, Israel

[73] Assignee: OLiVR Corporation Ltd., Jerusalem, Israel

[21] Appl. No.: 08/850,690

[22] Filed: May 2, 1997

[51] Int. Cl.⁶ .............................. G06T 5/00; G06K 9/42
[52] U.S. Cl. ......................... 709/219; 382/305; 345/428
[58] Field of Search .................... 707/513, 104; 395/200.47, 200.48, 200.49; 382/232, 286, 293, 305, 306; 709/219, 218, 217; 345/428, 426; 434/3, 130, 147, 150

[56] References Cited

U.S. PATENT DOCUMENTS

| | | | |
|---|---|---|---|
| 4,876,651 | 10/1989 | Dawson et al. | 701/200 |
| 4,897,867 | 1/1990 | Foster et al. | 379/93.02 |
| 5,030,117 | 7/1991 | Delorme | 434/130 |
| 5,119,188 | 6/1992 | McCalley et al. | 348/6 |
| 5,122,873 | 6/1992 | Golin | 348/390 |
| 5,195,092 | 3/1993 | Wilson et al. | 348/13 |
| 5,220,420 | 6/1993 | Hoarty et al. | 348/12 |
| 5,236,199 | 8/1993 | Thompson, Jr. | 436/41 |
| 5,251,209 | 10/1993 | Jurkevich et al. | 370/468 |
| 5,265,248 | 11/1993 | Moulios et al. | 395/670 |
| 5,283,819 | 2/1994 | Glick et al. | 379/93.01 |
| 5,325,423 | 6/1994 | Lewis | 379/93.08 |
| 5,339,415 | 8/1994 | Strout et al. | 709/106 |
| 5,351,276 | 9/1994 | Doll, Jr. et al. | 379/88.17 |
| 5,363,482 | 11/1994 | Victor et al. | 345/346 |
| 5,420,572 | 5/1995 | Dolin, Jr. et al. | 340/825.22 |
| 5,420,801 | 5/1995 | Dockter et al. | 345/501 |
| 5,437,032 | 7/1995 | Wolf et al. | 709/107 |
| 5,438,658 | 8/1995 | Fitzpatrick et al. | 345/331 |
| 5,487,167 | 1/1996 | Dinallo et al. | 345/302 |
| 5,495,576 | 2/1996 | Ritchey | 345/425 |
| 5,508,940 | 4/1996 | Rossmere et al. | 345/328 |
| 5,519,435 | 5/1996 | Anderson | 345/302 |
| 5,553,221 | 9/1996 | Reimer et al. | 345/333 |
| 5,553,222 | 9/1996 | Milne et al. | 345/302 |
| 5,557,538 | 9/1996 | Retter et al. | 348/402 |
| 5,561,791 | 10/1996 | Mendelson et al. | 395/200.63 |
| 5,564,001 | 10/1996 | Lewis | 345/302 |
| 5,577,180 | 11/1996 | Reed | 345/435 |
| 5,577,258 | 11/1996 | Cruz et al. | 395/200.49 |
| 5,581,783 | 12/1996 | Ohashi | 395/825 |
| 5,710,835 | 1/1998 | Bradley | 382/233 |
| 5,737,599 | 4/1998 | Rowe et al. | 707/104 |
| 5,764,235 | 6/1998 | Hunt et al. | 345/428 |

*Primary Examiner*—Dung C. Dinh
*Attorney, Agent, or Firm*—Blakely, Sokoloff, Taylor & Zafman LLP

[57] ABSTRACT

Apparatus and a method for communicating media over a network including encoding the media into a server database at a server, downloading from the server database to a client database generally only those portions of the media which are necessary to satisfy user requests and in response to a user request for a given item of media, determining whether the media is present in the client database, and if not, automatically downloading those portions of the media which are necessary to supply the user with the given item of media from the server database.

30 Claims, 2 Drawing Sheets

METHOD AND SYSTEM FOR PROVIDING ON-LINE INTERACTIVITY OVER A SERVER-CLIENT NETWORK

FIELD OF THE INVENTION

The present invention relates to server-client networks generally, and more specifically to on-line access of interactive media over the Internet.

BACKGROUND OF THE INVENTION

Various techniques are known for providing on-line access of interactive media over the Internet.

The following U.S. Patents have been found in a U.S. Patent Search and are believed to be generally relevant to the field of the invention:

U.S. Pat. No. 4,897,867 January 1990 Foster et al.
U.S. Pat. No. 5,119,188 June 1992 McCalley et al.
U.S. Pat. No. 5,122,873 June 1992 Golin
U.S. Pat. No. 5,195,092 March 1993 Wilson et al.
U.S. Pat. No. 5,220,420 June 1993 Hoarty et al.
U.S. Pat. No. 5,236,199 August 1993 Thompson. Jr.
U.S. Pat. No. 5,251,209 October 1993 Jurkevich et al.
U.S. Pat. No. 5,265,248 November 1993 Moulios et al.
U.S. Pat. No. 5,283,819 January 1994 Glick et al.
U.S. Pat. No. 5,325,423 June 1994 Lewis
U.S. Pat. No. 5,351,276 September 1994 Doll, Jr. et al.
U.S. Pat. No. 5,363,482 November 1994 Victor et al.
U.S. Pat. No. 5,420,572 May 1995 Dolin, Jr. et al.
U.S. Pat. No. 5,420,801 May 1995 Dockter et al.
U.S. Pat. No. 5,438,658 August 1995 Fitzpatrick et al.
U.S. Pat. No. 5,487,167 January 1995 Dinallo et al.
U.S. Pat. No. 5,495,576 February 1996 Ritchey
U.S. Pat. No. 5,508,940 April 1996 Rossmere et al.
U.S. Pat. No. 5,519,435 May 1996 Anderson
U.S. Pat. No. 5,553,221 September 1996 Reimer et al.
U.S. Pat. No. 5,553,222 September 1996 Milne et al.
U.S. Pat. No. 5,557,538 September 1996 Retter et al.
U.S. Pat. No. 5,561,791 October 1996 Mendelson et al.
U.S. Pat. No. 5,564,001 October 1996 Lewis
U.S. Pat. No. 5,577,180 November 1996 Reed
U.S. Pat. No. 5,577,258 November 1996 Cruz et al.
U.S. Pat. No. 5,581,783 December 1996 Ohashi When using, various media such as video, audio, text and images, a user generally retrieves the media from a storage device or "server" connected via a network to many client computers. The server downloads the media to the network and transmits it to the client computer at the user's request.

There are two basic limitations involved in such data retrieval: delay between the time that a user requests the data and the time when the server downloads it to the network, and bandwidth limitations on data throughput and rate of data transmission.

One example of such a server-client network is a network connecting Internet servers and users' personal computers. Such networks are installed in order to facilitate convenient data transmission between users and data distribution from the server to the users' computers.

Known network applications involve streaming data from a server to a client computer (hereinafter also referred to as "client"). "Streaming" refers to serial or parallel transmission of digital data between two computers, by transmitting sequences of bit packets. For example, installation executables on a network server stream files to a client computer performing the installation. Servers with large amounts of memory are used to archive digital movies, which are streamed to a client computer for viewing upon demand. Digital video is broadcast from cable stations to subscribers using streaming. Internet browsers, such as Netscape and Microsoft Explorer, are used to stream data from a server on the web to a client.

Internet web sites can contain enormous databases, such as phone directories for all of the cities in the U.S., photographs from art galleries and museums around the world, voluminous encyclopedias, and even copies of all patents ever issued by the U.S. Patent & Trademark Office. Users of the Internet can search these databases and then request the server to download specific information. This request initiates a streaming event.

SUMMARY OF THE INVENTION

In U.S. patent application Ser. No. 08/778,830, filed Jan. 6, 1997 and entitled METHOD AND SYSTEMS FOR SCALABLE REPRESENTATION OF MULTIMEDIA DATA FOR PROGRESSIVE ASYNCHRONOUS TRANSMISSION, the disclosure of which is hereby incorporated by reference, there is described a method and system for delivering on-line interactive media over a server-client network, by means of three databases: (i) a server database, (ii) a client database, and (iii) an interactive database. The mode of delivery described therein is one of partitioning the media into blocks, and pushing the successive blocks from server to client in background, as the media is being interactively accessed by a user. The user has little influence over the data content being delivered to the client database, but has great influence over the interactive database, once the client database is sufficiently large.

The present invention seeks to provide a method and system for enabling digital media to be interactively accessed on-line within a server-client network such as the Internet. In distinction to U.S. patent application Ser. No. 08/778,830, referenced above, which delivers the entire media file to the user, the present invention operates using a "just enough data" policy. That is, rather than providing all of the media from the server computer to the client computer in background, the only data transmitted from the server to the client is the specific data needed by the user, i.e., the specific data necessary to satisfy the interactive request of the user.

There is thus provided in accordance with a preferred embodiment of the present invention a method for communicating media over a network including encoding the media into a server database at a server, downloading from the server database to a client database generally only those portions of the media which are necessary to satisfy user requests, and in response to a user request for a given item of media, determining whether the media is present in the client database, and if not, automatically downloading those portions of the media which are necessary to supply the user with the given item of media from the server database.

Further in accordance with a preferred embodiment of the present invention the method also includes the step of playing the given item of media to the user.

Still further in accordance with a preferred embodiment of the present invention the method also includes storing in the client database, those portions of the media which are automatically downloaded from the server database, thereby gradually building up the client database.

Moreover in accordance with a preferred embodiment of the present invention the step of playing includes playing a first portion of media received from the client database and playing a second portion of media received from the server database.

Additionally in accordance with a preferred embodiment of the present invention the method also includes identifying which portions of media are needed to satisfy a user request are stored in a client database.

Further in accordance with a preferred embodiment of the present invention the step of identifying includes translating an interactive user request for media into fetch addresses.

Still further in accordance with a preferred embodiment of the present invention the encoding step includes compressing.

Moreover in accordance with a preferred embodiment of the present invention the encoding step includes compressing and also including, prior to the playing step, decompressing the media.

Additionally in accordance with a preferred embodiment of the present invention the identifying step takes place both at the server computer and at a client computer.

Further in accordance with a preferred embodiment of the present invention the media is stored in a directly playable media database prior to playing thereof.

There is also provided in accordance with a preferred embodiment of the present invention apparatus for communicating media over a network including a server which includes a server database having media encoded therein, and a server access controller enabling generally only those portions of the media which are necessary to satisfy user requests to be identified and downloaded from the server database to a client database, and a user computer including a client database, and a client database manager operative to determine whether a user requested item of media is present in the client database and, if such item is not present, to automatically download those portions of the media which are necessary to supply the user with the user requested item of media from the server database via the server access controller.

Further in accordance with a preferred embodiment of the present invention there is also provided a player for playing the given item of media to the user.

Still further in accordance with a preferred embodiment of the present invention there is also provided apparatus for storing in the client database those portions of the media which are automatically downloaded from the server database, so as to gradually build up the client database.

Moreover in accordance with a preferred embodiment of the present invention the player is operative to play a first portion of media received from the client database and to play a second portion of media received from the server database.

Additionally in accordance with a preferred embodiment of the present invention there is also provided an access controller, to identify which portions of media needed to satisfy a user request are stored on a client database.

Further in accordance with a preferred embodiment of the present invention the access controller is also operative to translate an interactive user request for media into fetch addresses.

Still further in accordance with a preferred embodiment of the present invention there is provided an encoder that performs data compression.

Moreover in accordance with a preferred embodiment of the present invention there is provided an encoder that performs data compression and a decompressor that performs data decompression prior to playing.

Additionally in accordance with a preferred embodiment of the present invention the access controller includes both a server access controller and a client access controller.

Further in accordance with a preferred embodiment of the present invention there is also provided a directly playable media database for storing media prior to playing it.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
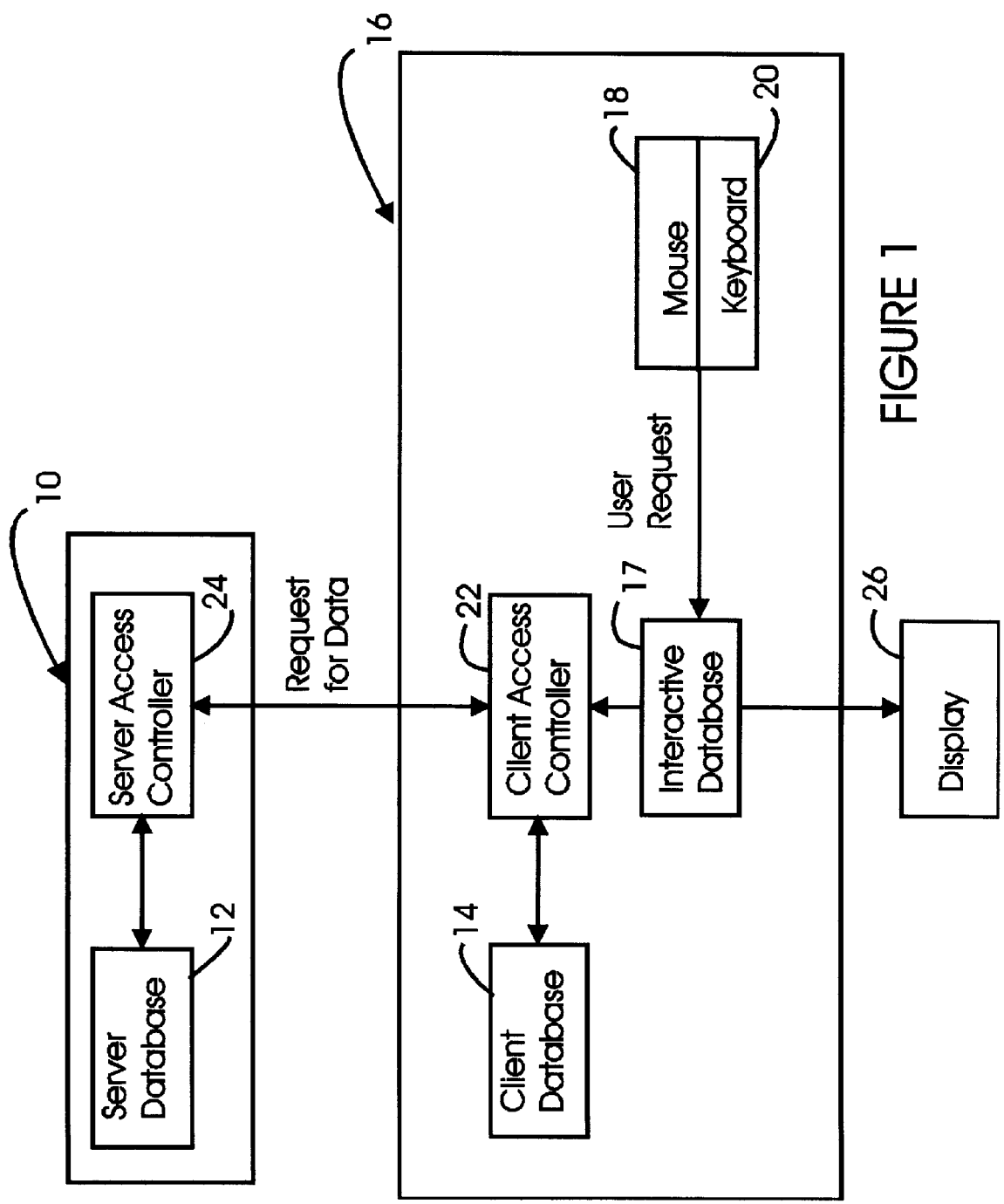
FIG. 1 is a simplified illustration of a system and method for transmitting digital media data from a server to a client in accordance with a preferred embodiment of the present invention.

Reference is now made to FIG. 1, which is a simplified illustration of a system and method for transmitting digital media data from a server to a client in accordance with a preferred embodiment of the present invention. Digital media is encoded and stored on a server computer 10 within a database 12, for interactive access by users who are networked to the server computer. Interactive access can involve viewing the media, if it is an image, playing it, if it is a movie, or listening to it, if it is an audio signal.

The basic principle of the present invention is for the server to send just enough data to enable the interactive access which the user desires. The data is managed through the use of two databases: the server database 12, residing on the server computer 10, and a client database 14, which is built up on a client computer 16 dynamically, as data is streamed from the server to the client.

Typically the server and client databases contain encoded data, compressed to minimize transmission time. In view of the use of compressed data, there may also optionally be employed a third database 17, as described in U.S. patent application Ser. No. 08/778,830, referenced above. The third database is an interactive database on the client computer, which contains decoded data, ready for instant access and which serves as a directly playable media database.

For example, suppose the media is a large still image at which the user is gazing, and that the server database contains multiple tiles of the image at different resolutions. When the user initiates a request to gaze at a portion of the image, using a mouse 18 or keyboard 20, the only data transmitted consists of the specific tiles at the specific resolution which are to be displayed. None of the other tiles are transmitted. As the user proceeds to gaze and pan through the image, additional tiles are sent.

The collection of tiles received by the client computer 16 is stored locally in the client computer, in the client database 14. Since the received tiles are thus locally available to the client, whenever the user requests data that was previously accessed, that data can be accessed locally, without the need to transmit it from the server. Since interactive applications typically involve repeated access to the same data, the client database 14 serves to speed up the interactivity as database 14 is built up.

As another example, suppose the media is a movie that the user is viewing. When the user initiates a request to view a specific frame of the movie, the only data transmitted is that specific frame. None of the other frames are transmitted. As the user advances forward and backward within the movie, additional frames are sent. The frames received by the client computer 16 are stored locally in the client database 14, so that whenever the user returns to a frame which was previously viewed, the data is readily available on the local computer.

Interactive commands input by means of a mouse 18 and keyboard 20 are used to zoom in and out, pan, advance frames, and link to other parts of the media by means of hot spots. Any client computer 16 which is networked to the server can access the media. When a user issues an interactive command, a client access controller 22 identifies the portion of the digital media that is necessary to fulfill the user's request. Initially, before a client database 14 is built up, the client access controller 22 issues a request to a server access controller 24 in the server computer for the data it has identified. Access controller 24 fetches from server database 12 only the portion of data necessary to fulfill the user's request, and then transmits it to the client computer.

The data received by the client computer is then delivered to display 26. In addition, the data is stored in the client database 14. Once the client database is no longer empty, the client access controller 22 first checks whether all of the data it seeks in order to fulfill the user's request is already available in the client database 14. If so, it does not send a request to the server computer, but rather delivers the data from the client database to display 26. Otherwise, it issues a request to the server database 12 via controller 24, as described above, for such data which is not yet available in the client database 14. Once the server transmits such data, the received data is incorporated in the client database 14.

Figure 2:
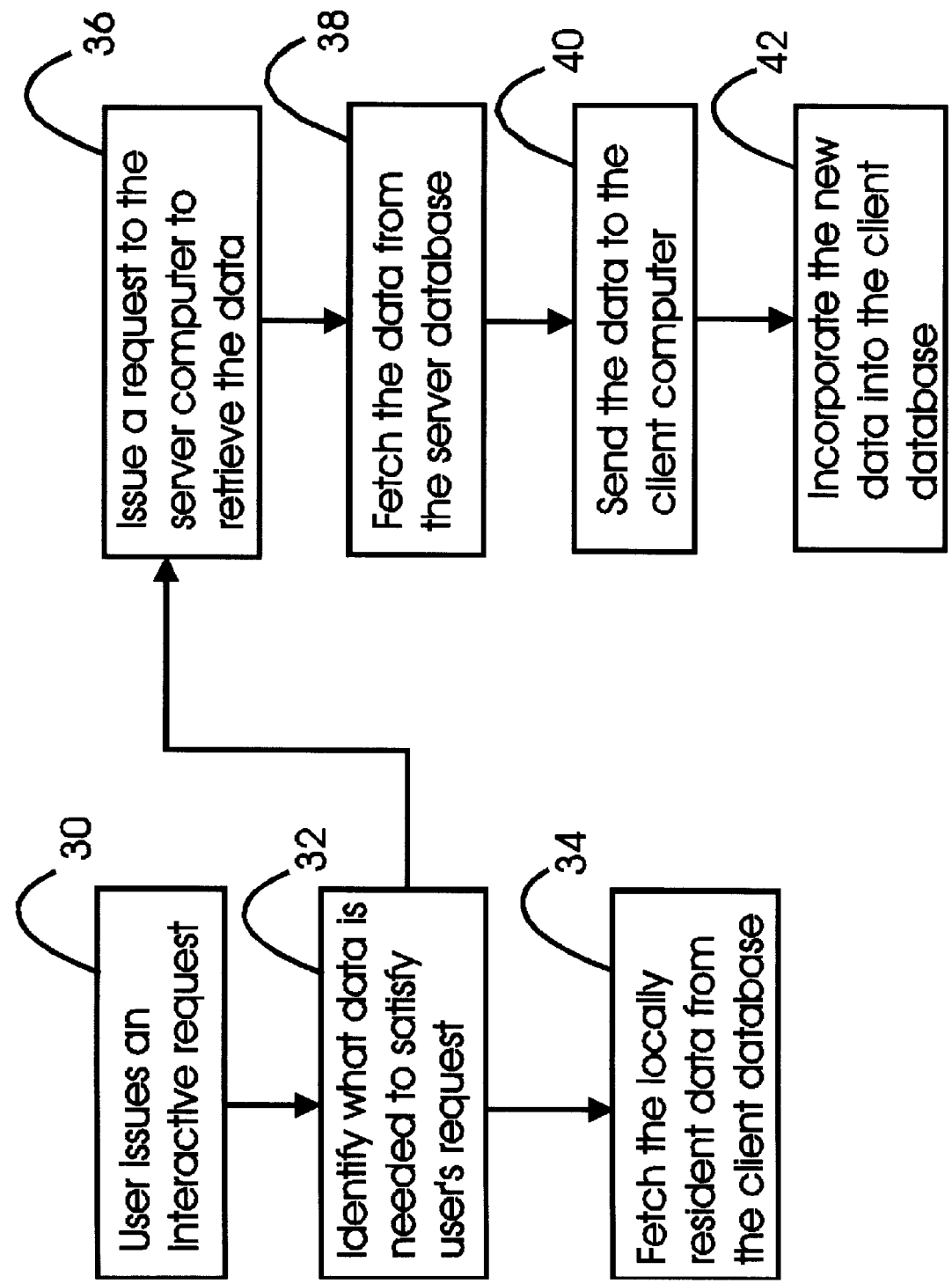
FIG. 2 is a simplified flowchart illustrating operation of the system and method of FIG. 1.

Reference is now made to FIG. 2, which is a simplified flowchart illustrating the operation of the system and method of FIG. 1. At step 30 a user of a client computer initiates an interactive request to access media which is stored on a remote server computer. At step 32 the client computer identifies what data is necessary in order to satisfy the user's request.

To the extent that the data already resides in the local client database, the data is fetched at step 34 directly from the local computer. To the extent that the data does not already reside in the local client database, at step 36 a request is issued to the server computer to provide the necessary data. At step 38 the server computer fetches the data from its database, and at step 40 the fetched data is sent to the client computer for user access. Finally, at step 42, the received data is added to the client database.

It will be appreciated by persons skilled in the art that the present invention is not limited by what has been particularly shown and described hereinabove. The present invention also includes combinations and subcombinations of the various features described hereinabove as well as variations and extensions thereof which would occur naturally to persons skilled in the art and which are not part of the prior art.

I claim:

1. A method for communicating a digital image over a network, comprising the steps of:

storing a digital image having a plurality of image tiles at a plurality of resolutions on a server computer;

in response to a user request for a given image portion at a given resolution, identifying those image tiles which are necessary to display the given image portion at the given resolution; and determining whether the image tiles which are necessary to display the given image portion at the given resolution are present in a user tile database, and if not, automatically downloading from the server computer those image tiles which are necessary to display the given image portion at the given resolution but are not present in the user tile database.

2. A method according to claim 1 and further comprising the step of displaying the given image portion at the given resolution to the user.

3. A method according to claim 1 and further comprising the step of storing in the user tile database those image tiles that are automatically downloaded, thereby to gradually build up the user tile database.

4. A method according to claim 1 wherein said identifying step is performed at a user's computer.

5. A method according to claim 1 wherein said identifying step is performed at the server computer.

6. A method according to claim 1 wherein said identifying step is performed at a user's computer and at the server computer.

7. A method according to claim 1 wherein the image tiles are compressed image tiles.

8. A method according to claim 2 wherein the image tiles are compressed image tiles, and further comprising, prior to said displaying step, the step of decompressing the image tiles which are necessary to display the given image portion at the given resolution.

9. A method according to claim 2 wherein image tiles are stored in a directly viewable image buffer prior to displaying the given image portion at the given resolution.

10. Apparatus for communicating a digital image over a network, comprising:

a server computer storing a digital image having a plurality of image tiles at a plurality of resolutions;

a tile access controller identifying those image tiles necessary to display a requested image portion at a requested resolution; and a client computer including:
      a client database of image tiles; and
      a client tile database manager operative to determine whether the image tiles necessary to display a requested image portion at a requested resolution are present in said client database and, if not, to automatically download from said server computer those image tiles which are necessary to display the requested image portion at the requested resolution but are not present in said client database.

11. Apparatus according to claim 10 and further comprising a display device connected to said client computer for displaying the given image portion at the given resolution.

12. Apparatus according to claim 10 and further comprising apparatus for storing in said client database those image tiles which are automatically downloaded, thereby to gradually build up said client database.

13. Apparatus according to claim 10 wherein said tile access controller is located within said client computer.

14. Apparatus according to claim 10 wherein said tile access controller is located within said server computer.

15. Apparatus according to claim 10 wherein said tile access controller is located within said client computer and within said server computer.

16. Apparatus according to claim 10 wherein the image tiles are compressed image tiles.

17. Apparatus according to claim 11 wherein the image tiles are compressed image tiles, and further comprising a decompressor that performs data decompression prior to displaying the given image portion at the given resolution on said display device.

18. Apparatus according to claim 11 and further comprising a directly viewable image buffer for storing image tiles prior to displaying them.

19. A method for communicating a digital image over a network, comprising the steps of:
  storing a digital image having a plurality of image tiles at a plurality of resolutions on a server computer;
  in response to a user request for a given image portion at a given resolution, identifying by the server computer those image tiles which are necessary to display the given image portion at the given resolution; and
  transmitting from the server computer those image tiles which are necessary to display the given image portion at the given resolution, thereby obviating the need to transmit an offset table.

20. A method according to claim 19 wherein said identifying step includes the step of translating the user request for the given image portion at the given resolution into fetch addresses.

21. A method according to claim 19 wherein the image tiles are compressed image tiles.

22. A method according to claim 19 and further comprising the step of displaying the given image portion at the given resolution to the user.

23. A method according to claim 22 wherein the image tiles are compressed image tiles, and further comprising, prior to said displaying step, the step of decompressing the image tiles which are necessary to display the given image portion at the given resolution.

24. A method according to claim 22 wherein image tiles are stored in a directly viewable image buffer prior to displaying the given image portion at the given resolution.

25. Apparatus for communicating a digital image over a network, comprising:
  a server computer storing a digital image having a plurality of image tiles at a plurality of resolutions;
  a tile access controller located within said server computer identifying those image tiles necessary to display a requested image portion at a requested resolution; and
  a transmitter transmitting from the server computer those image tiles which are necessary to display the given image portion at the given resolution, thereby obviating the need to transmit an offset table.

26. Apparatus according to claim 25 wherein said access controller is also operative to translate the requested image portion at the requested resolution into fetch addresses.

27. Apparatus according to claim 25 wherein the image tiles are compressed image tiles.

28. Apparatus according to claim 25 and further comprising a display device connected to said client computer for displaying the given image portion at the given resolution.

29. Apparatus according to claim 28 wherein the image tiles are compressed image tiles, and further comprising a decompressor that performs data decompression prior to displaying the given image portion at the given resolution on said display device.

30. Apparatus according to claim 28 and further comprising a directly viewable image buffer for storing image tiles prior to displaying them.

\* \* \* \* \*